(12) United States Patent
Lee et al.

(10) Patent No.: US 11,647,273 B2
(45) Date of Patent: May 9, 2023

(54) CUSTOMIZED IMAGE-CAPTURING MODULE PARTIALLY DISPOSED INSIDE RECEIVING SPACE OF CIRCUIT SUBSTRATE, AND PORTABLE ELECTRONIC DEVICE USING THE SAME

(71) Applicant: AZUREWAVE TECHNOLOGIES, INC., New Taipei (TW)

(72) Inventors: Tseng-Chieh Lee, New Taipei (TW); Kung-An Lin, New Taipei (TW); Chih-Yuan Chuang, New Taipei (TW); Chien-Che Ting, New Taipei (TW)

(73) Assignee: AZUREWAVE TECHNOLOGIES, INC., New Taipei (TW)

( * ) Notice: Subject to any disclaimer, the term of this patent is extended or adjusted under 35 U.S.C. 154(b) by 47 days.

(21) Appl. No.: 17/383,440

(22) Filed: Jul. 23, 2021

(65) Prior Publication Data

US 2022/0201173 A1  Jun. 23, 2022

(30) Foreign Application Priority Data

Dec. 18, 2020  (TW) ................................ 109144924

(51) Int. Cl.
*H04N 23/57* (2023.01)
*H04N 23/54* (2023.01)
*G02B 5/20* (2006.01)

(52) U.S. Cl.
CPC ............ *H04N 23/57* (2023.01); *H04N 23/54* (2023.01); *G02B 5/20* (2013.01)

(58) Field of Classification Search
CPC .. H04N 5/2257; H04N 5/2253; H04N 5/2254; G02B 5/20; G02B 7/02; H05K 1/111; H05K 1/181

See application file for complete search history.

(56) References Cited

U.S. PATENT DOCUMENTS

| 7,939,361 B2 | 5/2011 | Honda |
| 8,507,309 B2 * | 8/2013 | Mihara ............. H01L 27/14687 257/E33.056 |

(Continued)

FOREIGN PATENT DOCUMENTS

| CN | 102893593 B | 11/2016 |
| CN | 111371975 A | 7/2020 |

(Continued)

*Primary Examiner* — Gevell V Selby
(74) *Attorney, Agent, or Firm* — Li & Cai Intellectual Property Office

(57) ABSTRACT

A portable electronic device and a customized image-capturing module thereof are provided. The customized image-capturing module includes a carrier substrate, an image-capturing chip, and a lens assembly. The carrier substrate includes a carrier body, a plurality of first conductive pads, and a plurality of second conductive pads. The image-capturing chip is disposed inside a concave space of the carrier body, and the image-capturing chip includes a plurality of conductive chip pads. The second conductive pads are exposed from a bottom side of the carrier body, the conductive chip pads are electrically connected to the second conductive pads through the first conductive pads, respectively, so that when the customized image-capturing module is partially disposed inside a receiving space and positioned between two electronic elements, the second conductive pads can be electrically connected to conductive substrate pads of a circuit substrate through soldering materials, respectively.

10 Claims, 11 Drawing Sheets

(56) References Cited

U.S. PATENT DOCUMENTS

| | | | | |
|---|---|---|---|---|
| 2006/0154405 A1* | 7/2006 | Kinsman | ............ | H01L 27/1469 438/125 |
| 2007/0057150 A1* | 3/2007 | Webster | ............ | H01L 27/14618 250/208.1 |
| 2021/0168945 A1* | 6/2021 | Kim | ....................... | H04N 5/232 |

FOREIGN PATENT DOCUMENTS

| | | | |
|---|---|---|---|
| JP | 2004165240 | A | 6/2004 |
| JP | 20122378 | A | 1/2012 |
| KR | 1020090055889 | A | 6/2009 |
| KR | 101100790 | B1 | 1/2012 |
| TW | I502690 | B | 10/2015 |
| TW | M613027 | U | 6/2021 |

\* cited by examiner

CUSTOMIZED IMAGE-CAPTURING MODULE PARTIALLY DISPOSED INSIDE RECEIVING SPACE OF CIRCUIT SUBSTRATE, AND PORTABLE ELECTRONIC DEVICE USING THE SAME

CROSS-REFERENCE TO RELATED PATENT APPLICATION

This application claims the benefit of priority to Taiwan Patent Application No. 109144924, filed on Dec. 18, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an image-capturing module thereof, and more particularly to a portable electronic device and a customized image-capturing module thereof.

BACKGROUND OF THE DISCLOSURE

In the related art, a portable electronic device is usually equipped with an image-capturing module, but when the image-capturing module is assembled in the portable electronic device, a placement region for the image-capturing module is restricted by a pad arrangement of a main circuit board, so that the image-capturing module and the main circuit board still have room for improvement.

SUMMARY OF THE DISCLOSURE

In response to the above-referenced technical inadequacy, the present disclosure provides a portable electronic device and a customized image-capturing module thereof.

In one aspect, the present disclosure provides a customized image-capturing module including a carrier substrate, an image-capturing chip, and a lens assembly. The carrier substrate includes a carrier body, a plurality of first conductive pads disposed on the carrier body, a plurality of second conductive pads disposed on the carrier body, and a plurality of conductive circuits disposed inside the carrier body, and the carrier body has a through opening and a concave space in communication with the through opening. The image-capturing chip is disposed inside the concave space of the carrier body, and the image-capturing chip includes an image sensing region and a plurality of conductive chip pads respectively and electrically connected to the first conductive pads. The lens assembly includes a lens holder disposed on the carrier body and a lens structure carried by the lens holder. The second conductive pads are exposed from a bottom side of the carrier body, and the conductive chip pads of the image-capturing chip are electrically connected to the second conductive pads through the first conductive pads, respectively. When the customized image-capturing module is partially disposed inside a receiving space of a circuit substrate and positioned between two electronic elements, the second conductive pads of the carrier substrate are respectively and electrically connected to a plurality of conductive substrate pads of the circuit substrate.

In another aspect, the present disclosure provides a customized image-capturing module including a carrier substrate, an image-capturing chip, and a lens assembly. The carrier substrate includes a carrier body, a plurality of first conductive pads, and a plurality of second conductive pads, and the carrier body has a concave space. The image-capturing chip is disposed inside the concave space of the carrier body, and the image-capturing chip includes a plurality of conductive chip pads. The lens assembly is disposed on the carrier body. The second conductive pads are exposed from a bottom side of the carrier body, and the conductive chip pads of the image-capturing chip are electrically connected to the second conductive pads through the first conductive pads, respectively.

In yet another aspect, the present disclosure provides a portable electronic device using an image-capturing assembly. The image-capturing assembly includes a circuit substrate, a plurality of electronic elements disposed on the circuit substrate, and a customized image-capturing module disposed on the circuit substrate, and the customized image-capturing module includes a carrier substrate, an image-capturing chip, and a lens assembly. The carrier substrate includes a carrier body, a plurality of first conductive pads disposed on the carrier body, a plurality of second conductive pads disposed on the carrier body, and a plurality of conductive circuits disposed inside the carrier body, and the carrier body has a through opening and a concave space in communication with the through opening. The image-capturing chip is disposed inside the concave space of the carrier body, and the image-capturing chip includes an image sensing region and a plurality of conductive chip pads respectively and electrically connected to the first conductive pads. The lens assembly includes a lens holder disposed on the carrier body and a lens structure carried by the lens holder. The second conductive pads are exposed from a bottom side of the carrier body, and the conductive chip pads of the image-capturing chip are electrically connected to the second conductive pads through the first conductive pads, respectively.

Therefore, by virtue of "the carrier substrate including a carrier body, a plurality of first conductive pads, and a plurality of second conductive pads, and the carrier body having a concave space", "the image-capturing chip being disposed inside the concave space of the carrier body, and the image-capturing chip including a plurality of conductive chip pads", and "the second conductive pads being exposed from a bottom side of the carrier body, and the conductive chip pads of the image-capturing chip being electrically connected to the second conductive pads through the first conductive pads, respectively", when the customized image-capturing module is partially disposed inside the receiving space of the circuit substrate and positioned between two electronic elements, the second conductive pads of the carrier substrate can be electrically connected to the conductive substrate pads of the circuit substrate through the soldering materials, respectively.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
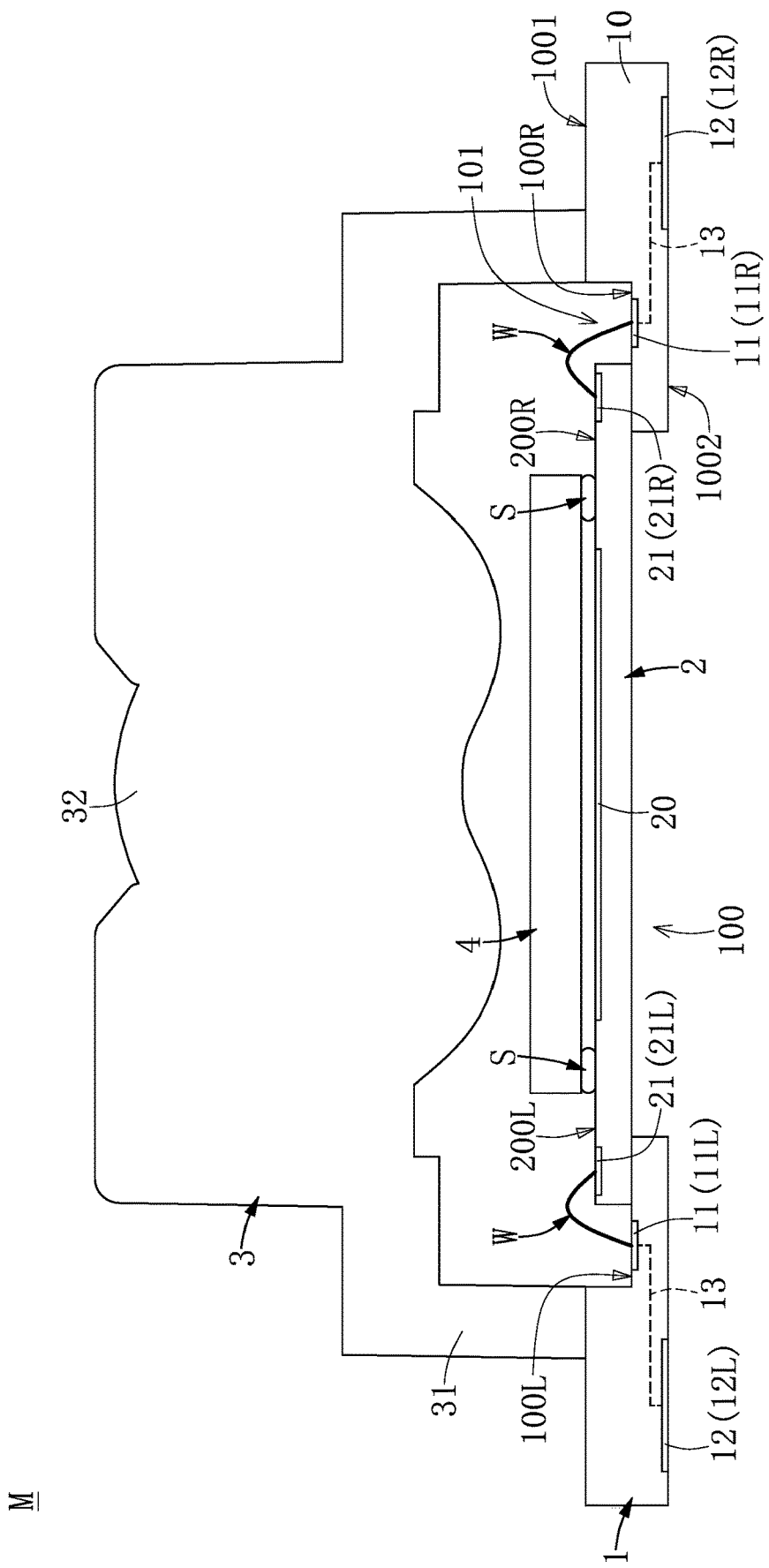
FIG. 1 is a schematic front view of a customized image-capturing module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 11, the present disclosure provides a customized image-capturing module M, an image-capturing assembly C using the customized image-capturing module M, and a portable electronic device Z using the image-capturing assembly C. The customized image-capturing module M includes a carrier substrate 1, an image-capturing chip 2, and a lens assembly 3. The carrier substrate 1 includes a carrier body 10, a plurality of first conductive pads 11, and a plurality of second conductive pads 12, and the carrier body 10 has a concave space 101. The image-capturing chip 2 is disposed inside the concave space 101 of the carrier body 10, and the image-capturing chip 2 includes a plurality of conductive chip pads 21. The lens assembly 3 is disposed on the carrier body 10. More particularly, the second conductive pads 12 can be exposed from a bottom side of the carrier body 10, and the conductive chip pads 21 of the image-capturing chip 2 can be electrically connected to the second conductive pads 12 through the first conductive pads 11, respectively. Therefore, when the customized image-capturing module M is partially disposed inside a receiving space P1000 of a circuit substrate P and positioned between two electronic elements E, the second conductive pads 12 of the carrier substrate 1 can be electrically connected to a plurality of conductive substrate pads P101 of the circuit substrate P through a plurality of soldering materials, respectively.

First Embodiment

Figure 2:
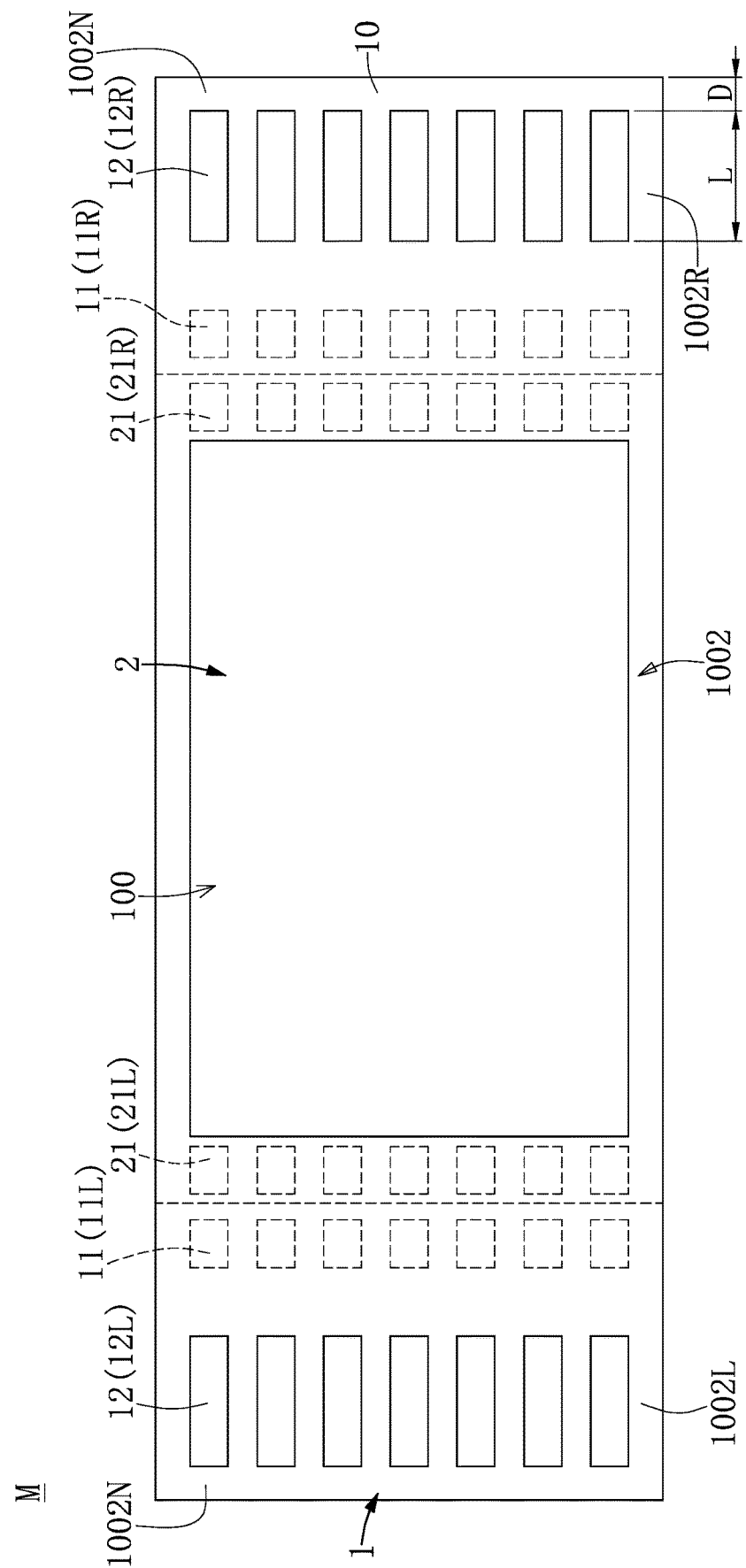
FIG. 2 is a schematic bottom view of the customized image-capturing module according to the first embodiment of the present disclosure.
Figure 3:
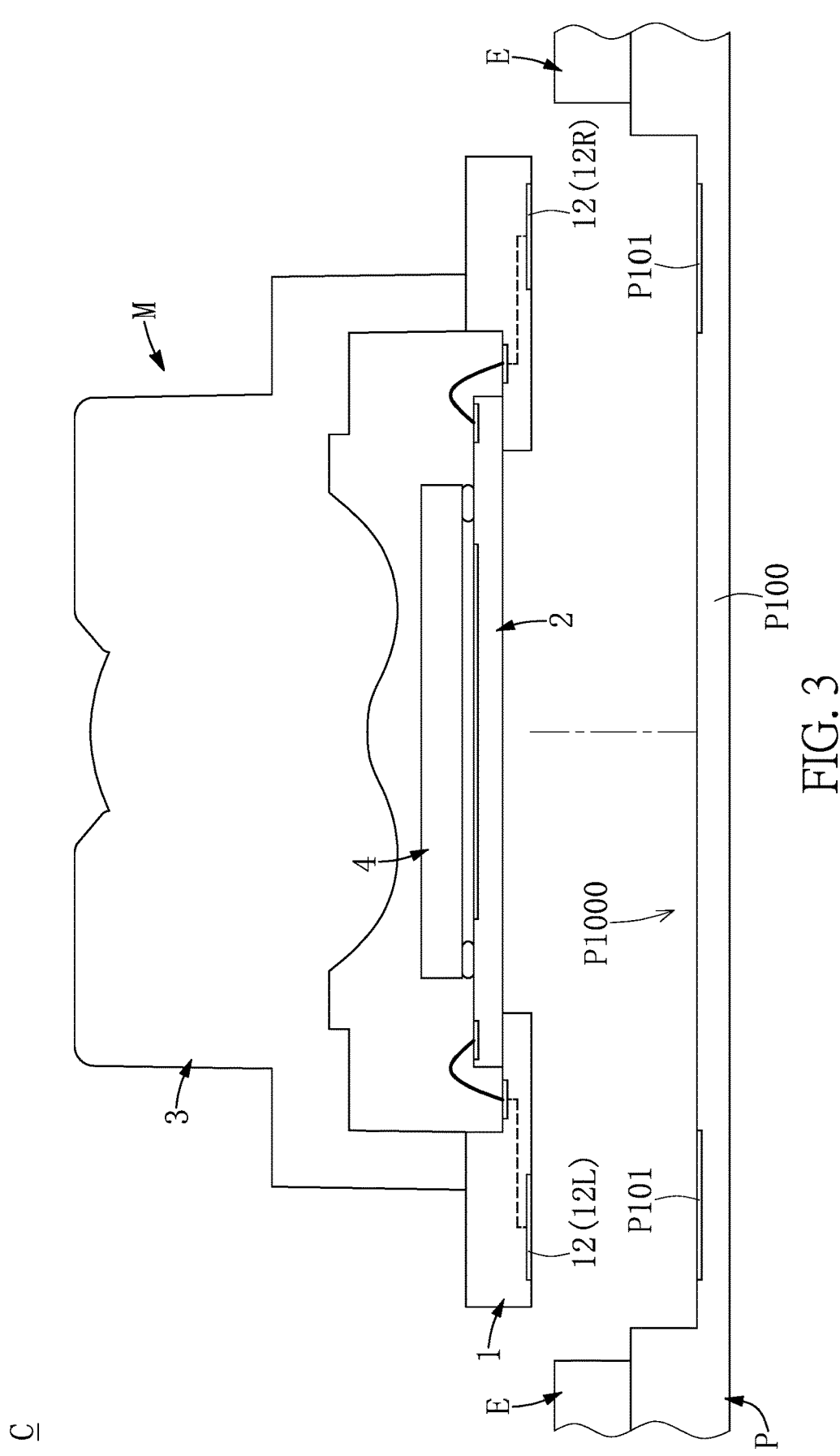
FIG. 3 is a schematic exploded view of an image-capturing assembly according to the first embodiment of the present disclosure.
Figure 4:
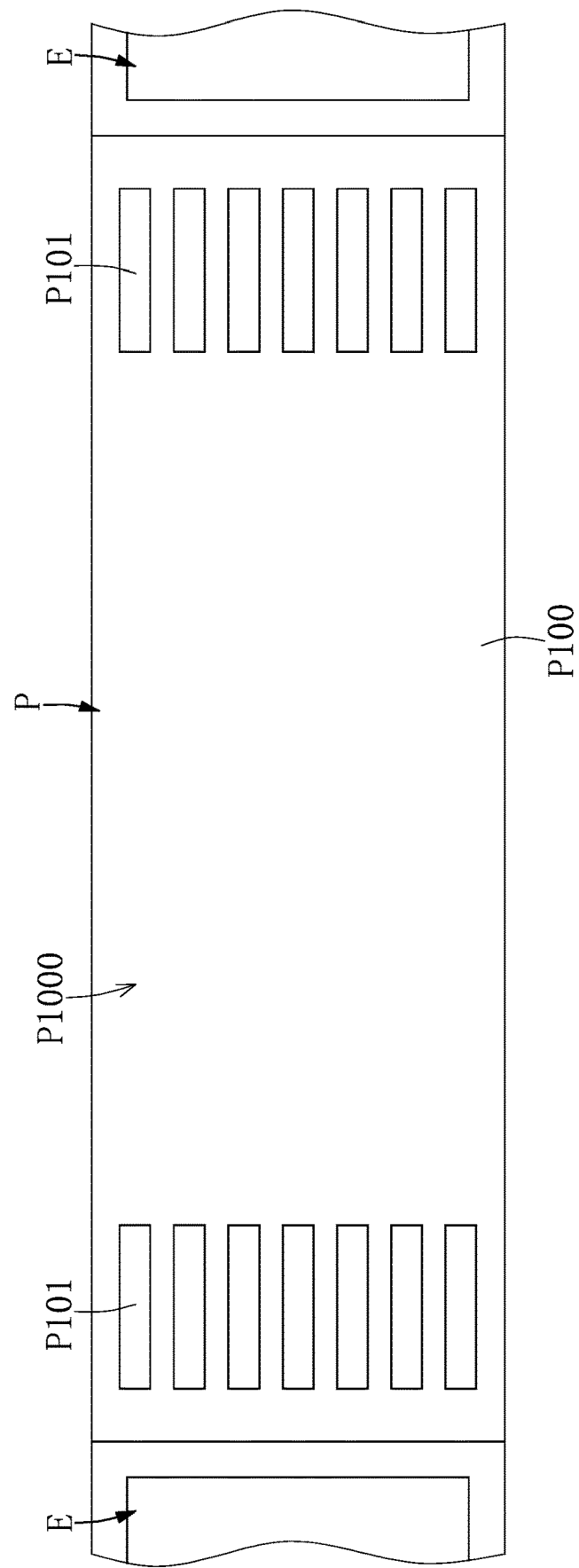
FIG. 4 is a schematic top view of a circuit substrate for carrying two electronic elements according to the first embodiment of the present disclosure.

Referring to FIG. 1 and FIG. 2, a first embodiment of the present disclosure provides a customized image-capturing module M including a carrier substrate 1, an image-capturing chip 2, and a lens assembly 3.

Firstly, as shown in FIG. 1, the carrier substrate 1 includes a carrier body 10, a plurality of first conductive pads 11 disposed on the carrier body 10, a plurality of second conductive pads 12 disposed on the carrier body 10, and a plurality of conductive circuits 13 (or conductive tracks) disposed inside (or outside) the carrier body 10, and the carrier body 10 has a through opening 100 and a concave space 101 in communication with the through opening 100.

More particularly, referring to FIG. 1 and FIG. 2, the first conductive pads 11 can be divided into a plurality of first left conductive pads 11L and a plurality of first right conductive pads 11R. The first left conductive pads 11L can be disposed on a first left region 100L inside the concave space 101, and the first right conductive pads 11R can be disposed on a first right region 100R inside the concave space 101, and the first left region 100L and the first right region 100R are two pad placement regions that are opposite to each other and corresponding to each other. Furthermore, the second conductive pads 12 can be divided into a plurality of second left conductive pads 12L and a plurality of second right conductive pads 12R. The second left conductive pads 12L can be disposed on a second left region 1002L of a bottom side of the carrier body 10, the second right conductive pads 12R can be disposed on a second right region 1002R of the bottom side of the carrier body 10, and the second left region 1002L and the second right region 1002R are two pad placement regions that are opposite to each other and corresponding to each other. It should be noted that except for the first left conductive pads 11L and the first right conductive pads 11R, there is no other conductive pad inside the concave space 101 of the carrier substrate 1. In addition, except for the second left conductive pads 12L and the second right conductive pads 12R, there is no other conductive pad on the bottom side of the carrier body 10. In other words, all of the conductive pads (such as the first conductive pads 11) inside the concave space 101 can only be distributedly disposed on the first left region 100L and the first right region 100R, and all of the conductive pads (such as the second conductive pads 12) disposed on the bottom side of the carrier body 10 can only be distributedly disposed on the second left region 1002L and the second right region 1002R, so that a width-wise space occupied by the carrier body 10 can be effectively reduced.

Furthermore, as shown in FIG. 1, the image-capturing chip 2 is disposed inside the concave space 101 of the carrier body 10, and the image-capturing chip 2 includes an image sensing region 20 and a plurality of conductive chip pads 21 respectively and electrically connected to the first conductive pads 11. For example, the image-capturing chip 2 can be completely received inside the concave space 101 of the carrier body 10, and does not protrude out of the concave space 101 of the carrier body 10 (that is to say, a top side of the carrier body 10 can be higher than a top side of the image-capturing chip 2). In addition, the image-capturing chip 2 can be a complementary metal-oxide semiconductor chip (CMOS) or a charge-coupled device chip (CCD). However, the aforementioned description for the image-capturing chip 2 of the first embodiment is merely an example and is not meant to limit the scope of the present disclosure.

More particularly, referring to FIG. 1 and FIG. 2, the conductive chip pads 21 can be divided into a plurality of left conductive chip pads 21L and a plurality of right conductive chip pads 21R. The left conductive chip pads 21L can be disposed on a left region 200L of the image-capturing chip 2, the right conductive chip pads 21R can be disposed on a right region 200R of the image-capturing chip 2, and the left region 200L and the right region 200R are two pad placement regions that are opposite to each other and corresponding to each other. It should be noted that except for the left conductive chip pads 21L and the right conductive chip pads 21R, there is no other conductive pad on the image-capturing chip 2. In other words, all of the conductive pads (such as the conductive chip pads 21) disposed on the image-capturing chip 2 can only be distributedly disposed on the left region 200L and the right region 200R, so that a width-wise space occupied by the image-capturing chip 2 can be effectively reduced.

Moreover, as shown in FIG. 1, the lens assembly 3 includes a lens holder 31 disposed on the carrier body 10, and a lens structure 32 that is carried by the lens holder 31. More particularly, the lens holder 31 can be disposed on an upper surface 1001 of the carrier body 10, and the concave space 101 can be recessed from the upper surface 1001 of the carrier body 10, so that the concave space 101 can face the lens structure 32. In addition, the first conductive pads 11 can be disposed inside the concave space 101 and face the lens assembly 3, the second conductive pads 12 can be disposed on a lower surface 1002 of the carrier body 10 and oppositely arranged to the lens assembly 3, and the conductive chip pads 21 can face the lens structure 32. For example, the lens holder 31 includes an actuator (not shown) for driving the lens structure 32, and the lens structure 32 can be composed of a plurality of optical lenses. However, the aforementioned description of the first embodiment is merely an example and is not meant to limit the scope of the present disclosure.

It is worth mentioning that as shown in FIG. 1, the customized image-capturing module M according to the first embodiment of the present disclosure further includes a light filtering element 4. The light filtering element 4 can be disposed above the image sensing region 20 of the image-capturing chip 2 by support of a plurality of supporters S, and the light filtering element 4 can be disposed between the image-capturing chip 2 and the lens structure 32.

It should be noted that as shown in FIG. 1, the conductive chip pads 21 can be electrically connected to the first conductive pads 11 through a plurality of conductive wires W (for example, metal wires that are formed by wire bonding), respectively. In addition, as shown in FIG. 2, the second conductive pad 12 has an area larger than that of the first conductive pad 11, and a minimum distance between a side of the second conductive pad 12 and a side of the carrier body 10 is less than a length L of the second conductive pad 12. Moreover, an unoccupied region 1002N is formed between the side of the second conductive pad 12 and the side of the carrier body 10, and there is no other pad or electronic element inside the unoccupied region 1002N.

Figure 5:
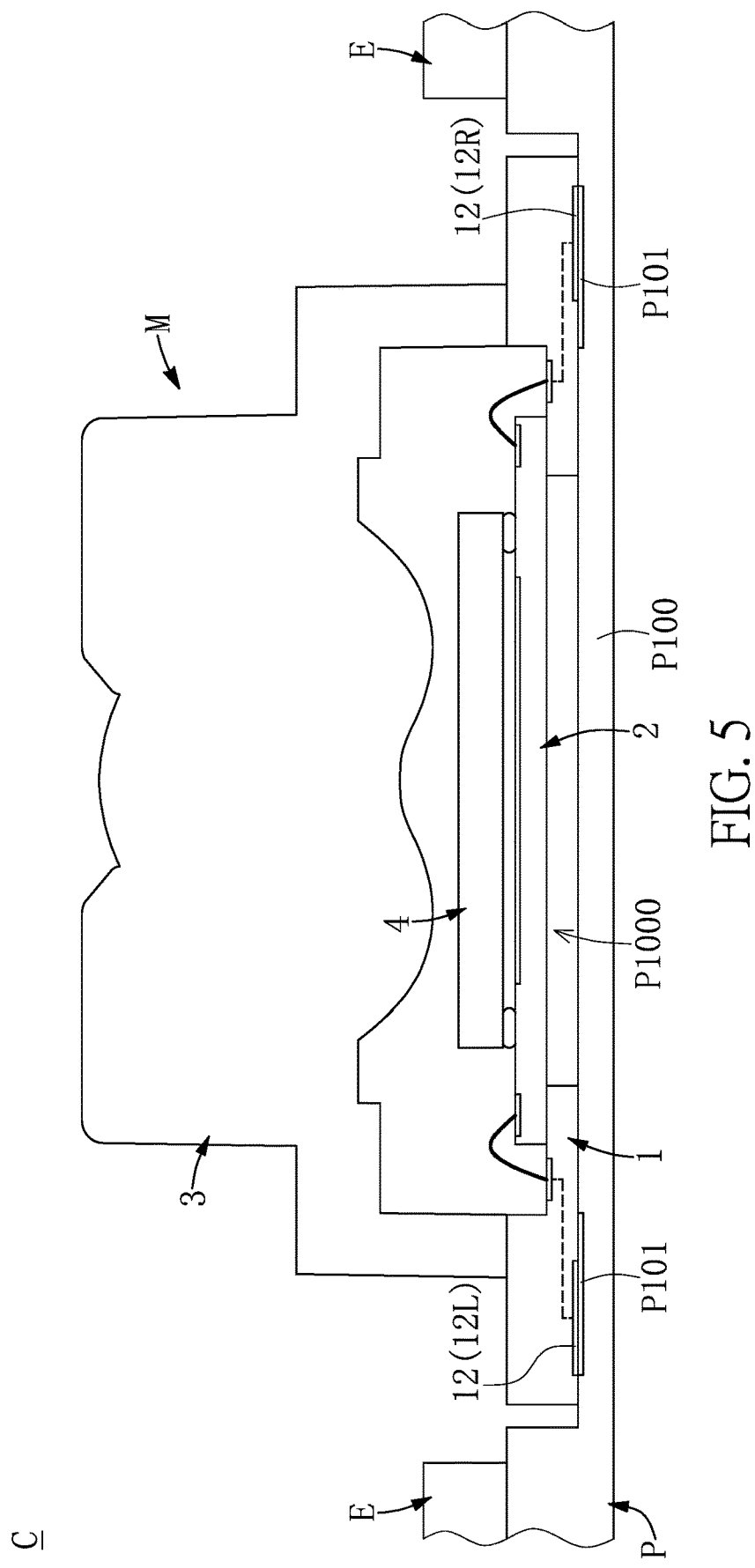
FIG. 5 is a schematic assembled view of the image-capturing assembly according to the first embodiment of the present disclosure.
Figure 6:
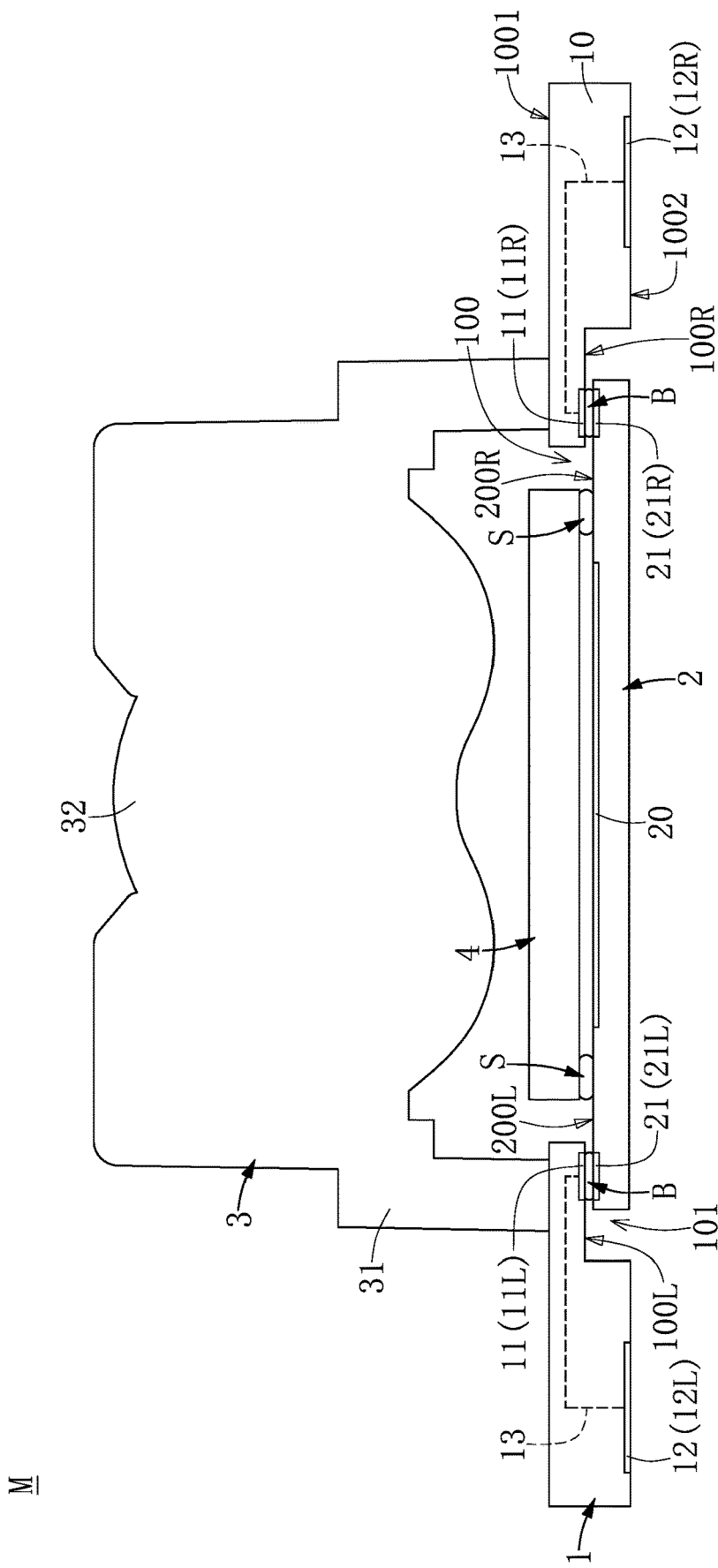
FIG. 6 is a schematic front view of a customized image-capturing module according to a second embodiment of the present disclosure.
Figure 7:
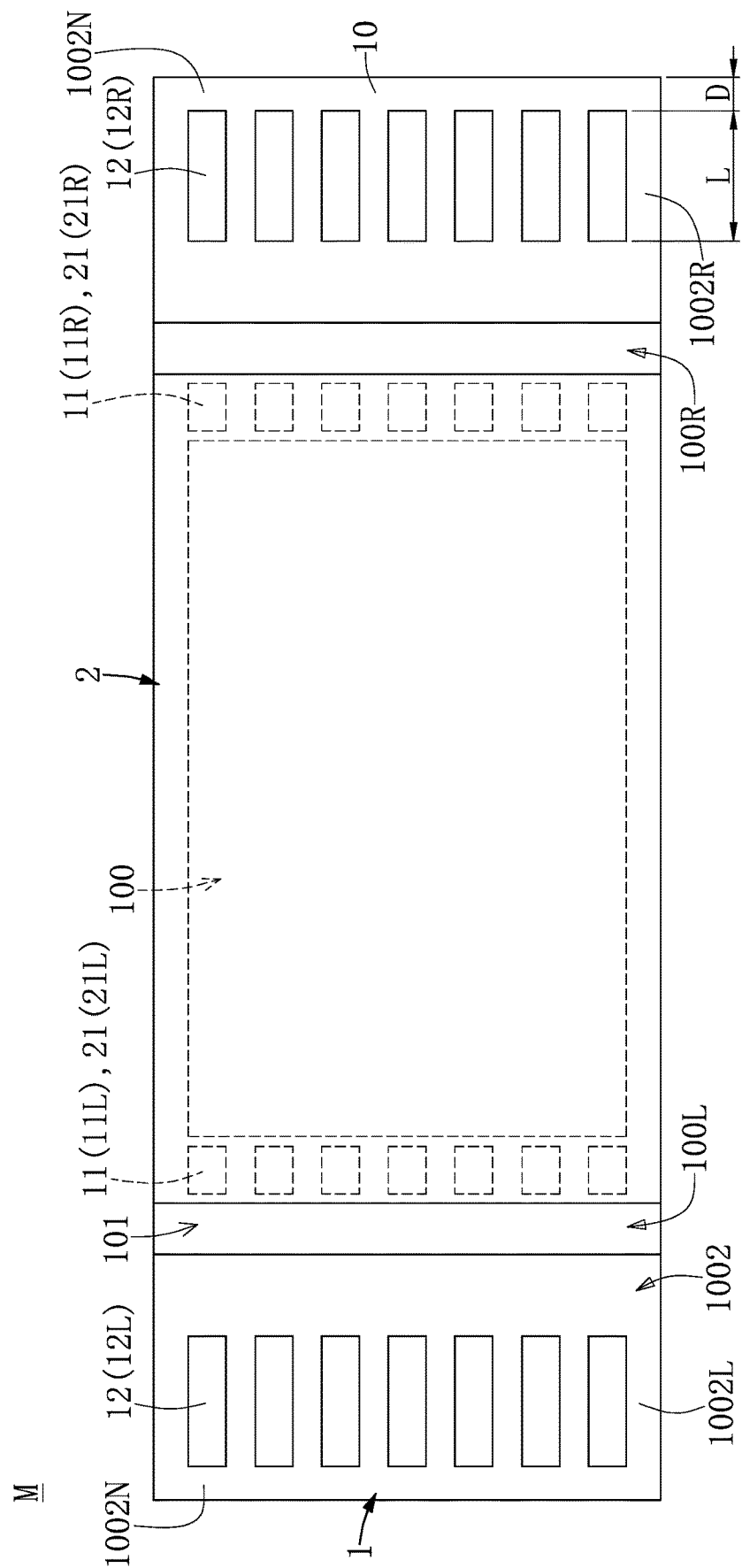
FIG. 7 is a schematic bottom view of the customized image-capturing module according to the second embodiment of the present disclosure.
Figure 8:
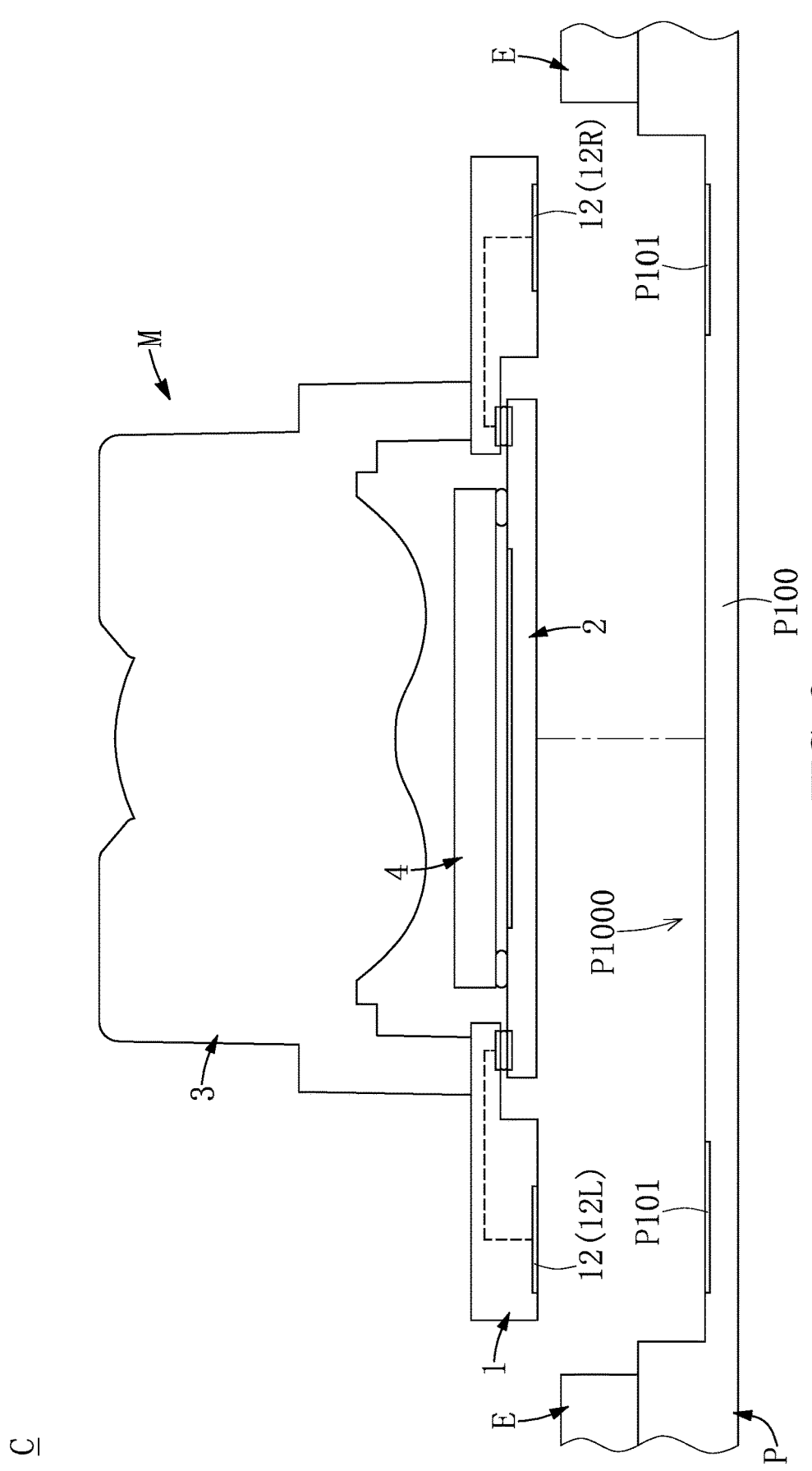
FIG. 8 is a schematic exploded view of an image-capturing assembly according to the second embodiment of the present disclosure.
Figure 9:
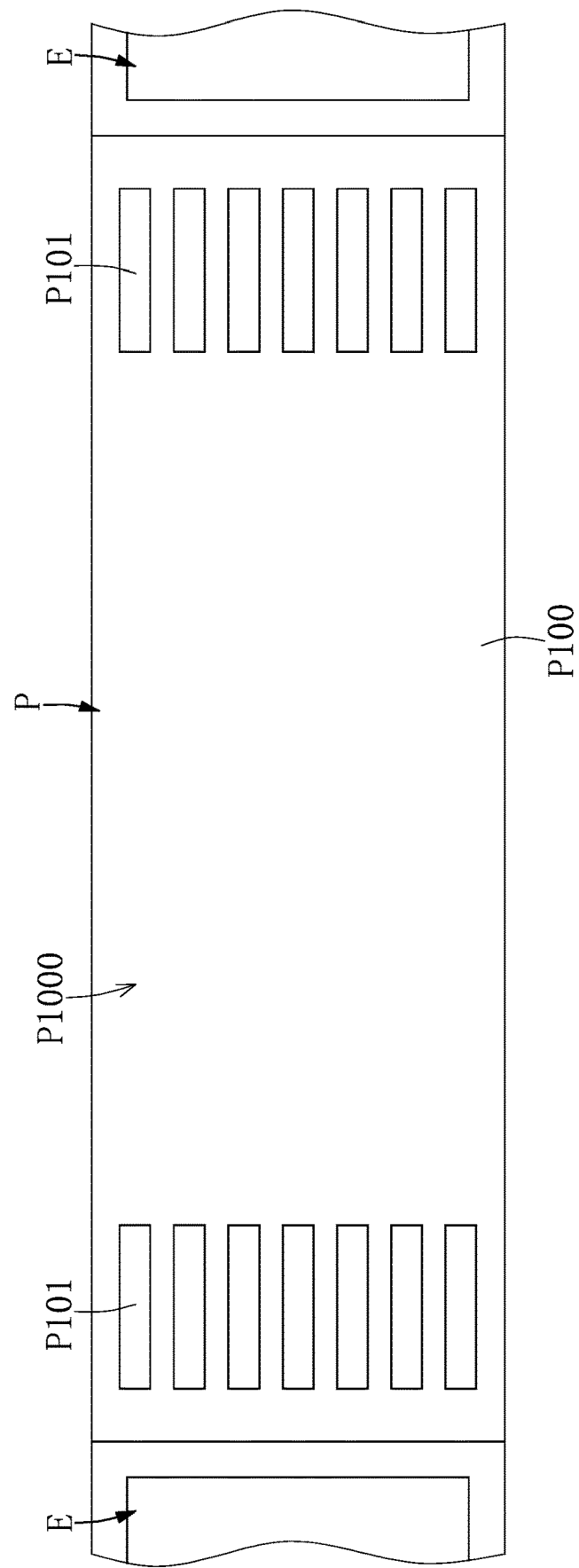
FIG. 9 is a schematic top view of a circuit substrate for carrying two electronic elements according to the second embodiment of the present disclosure.

Referring to FIG. 1 and FIG. 3 to FIG. 5, the first embodiment of the present disclosure provides an image-capturing assembly C. The image-capturing assembly C includes a circuit substrate P, a plurality of electronic elements E disposed on the circuit substrate P, and a customized image-capturing module M disposed on the circuit substrate P, and the customized image-capturing module M includes a carrier substrate 1, an image-capturing chip 2, and a lens assembly 3. More particularly, the circuit substrate P includes a substrate body P100 and a plurality of conductive substrate pads P101 disposed on the substrate body P100, and the substrate body P100 has a receiving space P1000 that is recessed from an upper surface of the substrate body P100. Moreover, the conductive substrate pads P101 are disposed inside the receiving space P1000 of the substrate body P100, and the electronic elements E are disposed on the upper surface of the substrate body P100. Therefore, as shown in FIG. 5, when the customized image-capturing module M is partially disposed inside the receiving space P1000 of the circuit substrate P and positioned between two electronic elements E, the second conductive pads 12 (including the left conductive chip pads 21L and the right conductive chip pads 21R) can be electrically connected to the conductive substrate pads P101 of the circuit substrate P through a plurality of soldering materials (not shown, such as solder balls, solder paste, or any kind of conductive materials), respectively.

Therefore, the second conductive pads 12 can be exposed from the bottom side of the carrier body 10, and the conductive chip pads 21 of the image-capturing chip 2 can be electrically connected to the second conductive pads 12 through the first conductive pads 11, respectively, so that when the customized image-capturing module M is partially disposed inside the receiving space P1000 of the circuit substrate P and positioned between two electronic elements E, the second conductive pads 12 of the carrier substrate 1 can be electrically connected to the conductive substrate pads P101 of the circuit substrate P through the soldering materials, respectively. In other words, when the second conductive pads 12 of the carrier substrate 1 and the conductive substrate pads P101 of the circuit substrate P are correspondingly electrically connected to each other, even if a user uses different types (such as different sizes or models) of the image-capturing chips 2 or different types (such as different sizes or models) of the lens assembly 3, any one of the different types of the image-capturing chips 2 or any one of the different types of the lens assembly 3 can be applied to the customized image-capturing module M of the present disclosure. Hence, the image-capturing chip 2 or the lens assembly 3 can be chosen in the customized image-capturing module M by the user according to different requirements.

Second Embodiment

Referring to FIG. 6 to FIG. 10, a second embodiment of the present disclosure provides a customized image-capturing module M and an image-capturing assembly C using the customized image-capturing module M. The customized image-capturing module M includes a carrier substrate 1, an image-capturing chip 2, and a lens assembly 3. Comparing FIGS. 6 to 10 with FIGS. 1 to 5 respectively, the difference between the second embodiment and the first embodiment is as follows: in the second embodiment, the concave space 101 is recessed from a lower surface 1002 of the carrier body 10, so that the concave space 101 is oppositely arranged to the lens structure 32. In addition, the first conductive pads 11 can be disposed inside the concave space 101 and are blocked by the carrier body 10 to be unable to face the lens assembly 3 (do not face the lens assembly 3 due to blocking of the carrier body 10). Moreover, the conductive chip pads 21 can face the concave space 101 and also face the first left region 100L and the first right region 100R inside the concave space 101, and the conductive chip pads 21 can be electrically connected to the first conductive pads 11 through a plurality of conductive bodies B (such as solder balls, solder paste, or any kind of conductive materials), respectively. Furthermore, the light filtering element 4 can be disposed between the image-capturing chip 2 and the lens structure 32 and partially received inside the through opening 100, so as to reduce the overall height of the customized image-capturing module M.

Figure 10:
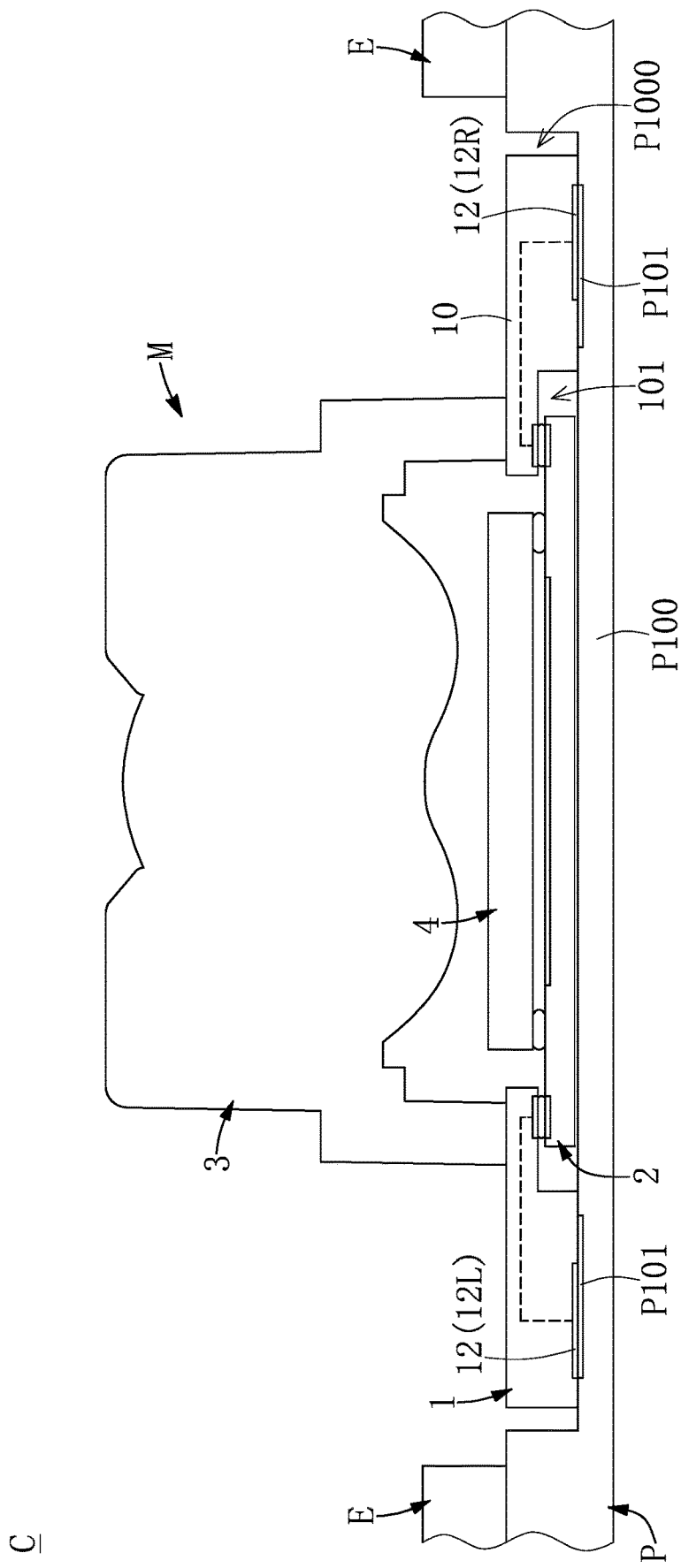
FIG. 10 is a schematic assembled view of the image-capturing assembly according to the second embodiment of the present disclosure.

It should be noted that as shown in FIG. 10, the image-capturing chip 2 can be completely received inside the concave space 101 of the carrier body 10, and does not protrude out of the concave space 101 of the carrier body 10 (that is to say, a bottom side of the carrier body 10 can be lower than a bottom side of the image-capturing chip 2), so that when the customized image-capturing module M is disposed on the circuit substrate P, the carrier body 10 can be used to prevent the image-capturing chip 2 from colliding with the circuit substrate P.

Therefore, the second conductive pads 12 can be exposed from the bottom side of the carrier body 10, and the conductive chip pads 21 of the image-capturing chip 2 can be electrically connected to the second conductive pads 12 through the first conductive pads 11, respectively, so that when the customized image-capturing module M is partially disposed inside the receiving space P1000 of the circuit substrate P and positioned between two electronic elements E, the second conductive pads 12 of the carrier substrate 1 can be electrically connected to the conductive substrate pads P101 of the circuit substrate P through the soldering materials, respectively.

Third Embodiment

Figure 11:
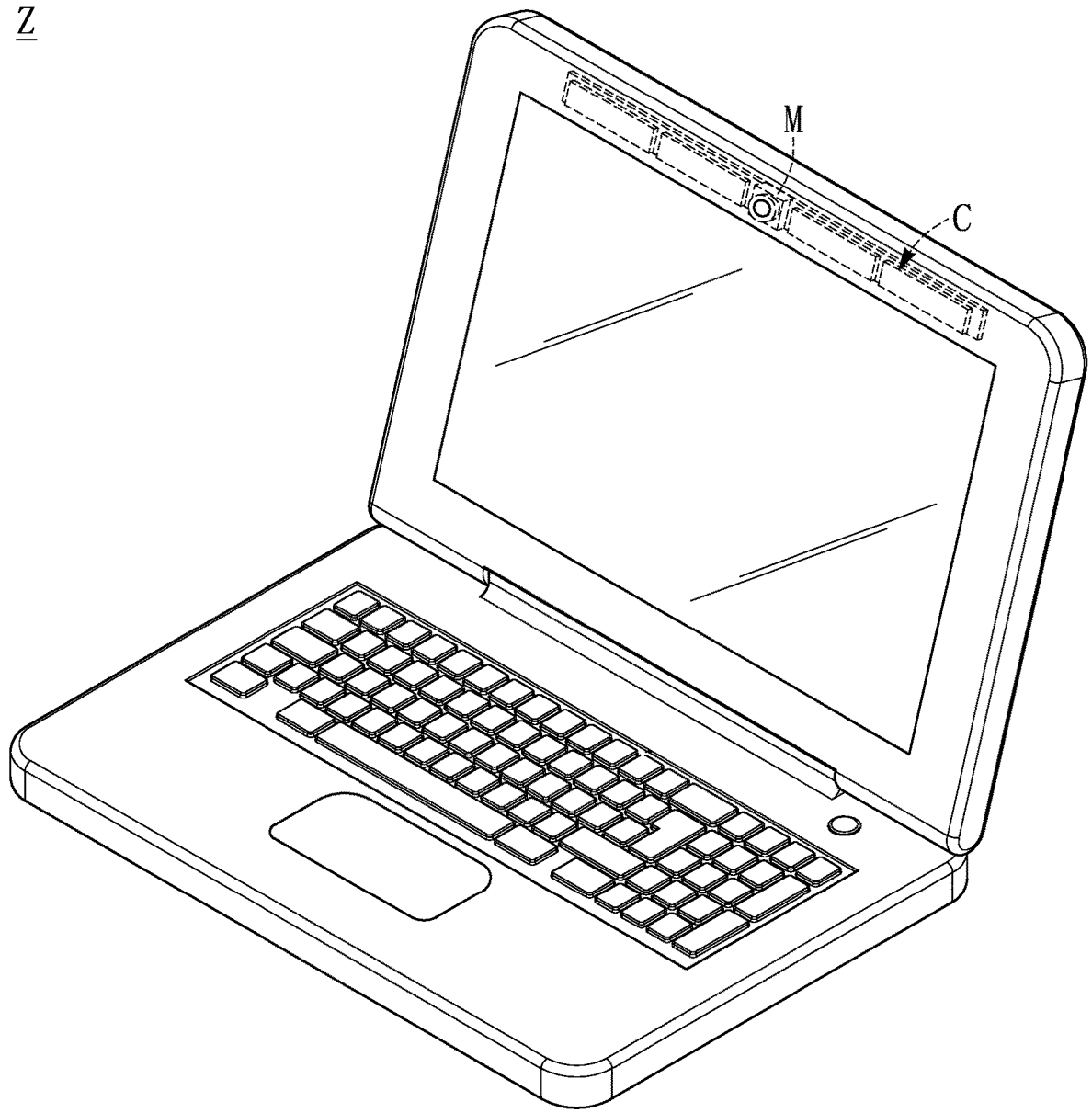
FIG. 11 is a schematic perspective view of a portable electronic device according to a third embodiment of the present disclosure.

Referring to FIG. 11, a third embodiment of the present disclosure provides a portable electronic device Z using an image-capturing assembly C. Referring to FIG. 5 or FIG. 10, the image-capturing assembly C includes a circuit substrate P, a plurality of electronic elements E disposed on the circuit substrate P, and a customized image-capturing module M disposed on the circuit substrate P, and the customized image-capturing module M includes a carrier substrate 1, an image-capturing chip 2, and a lens assembly 3. For example, the portable electronic device Z can be a notebook computer, a tablet computer or a smart phone, but it is not meant to limit the scope of the present disclosure.

Beneficial Effects of the Embodiments

In conclusion, by virtue of "the carrier substrate 1 including a carrier body 10, a plurality of first conductive pads 11, and a plurality of second conductive pads 12, and the carrier body 10 having a concave space 101", "the image-capturing chip 2 being disposed inside the concave space 101 of the carrier body 10, and the image-capturing chip 2 including a plurality of conductive chip pads 21", and "the second conductive pads 12 being exposed from a bottom side of the carrier body 10, and the conductive chip pads 21 of the image-capturing chip 2 being electrically connected to the second conductive pads 12 through the first conductive pads 11, respectively", when the customized image-capturing module M is partially disposed inside the receiving space P1000 of the circuit substrate P and positioned between two electronic elements E, the second conductive pads 12 of the carrier substrate 1 can be electrically connected to the conductive substrate pads P101 of the circuit substrate P through the soldering materials, respectively.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A customized image-capturing module, comprising:
a carrier substrate including a carrier body, a plurality of first conductive pads disposed on the carrier body, a plurality of second conductive pads disposed on the carrier body, and a plurality of conductive circuits disposed inside the carrier body, wherein the carrier body has a through opening and a concave space in communication with the through opening;
an image-capturing chip disposed inside the concave space of the carrier body, wherein the image-capturing chip includes an image sensing region and a plurality of conductive chip pads respectively and electrically connected to the first conductive pads;
a lens assembly including a lens holder disposed on the carrier body and a lens structure carried by the lens holder; and
a light filtering element disposed above the image sensing region of the image-capturing chip by support of a plurality of supporters, wherein the light filtering element is disposed between the image-capturing chip and the lens structure;

wherein the second conductive pads are exposed from a bottom side of the carrier body, and the conductive chip pads of the image-capturing chip are electrically connected to the second conductive pads through the first conductive pads, respectively;

wherein, when the customized image-capturing module is partially disposed inside a receiving space of a circuit substrate and positioned between two electronic elements, the second conductive pads of the carrier substrate are respectively and electrically connected to a plurality of conductive substrate pads of the circuit substrate.

2. The customized image-capturing module according to claim 1, wherein the image-capturing chip is completely received inside the concave space of the carrier body; wherein the first conductive pads are divided into a plurality of first left conductive pads and a plurality of first right conductive pads, the first left conductive pads are disposed on a first left region inside the concave space, and the first right conductive pads are disposed on a first right region inside the concave space; wherein the second conductive pads are divided into a plurality of second left conductive pads and a plurality of second right conductive pads, the second left conductive pads are disposed on a second left region of the bottom side of the carrier body, and the second right conductive pads are disposed on a second right region of the bottom side of the carrier body; wherein the conductive chip pads are divided into a plurality of left conductive chip pads and a plurality of right conductive chip pads, the left conductive chip pads are disposed on a left region of the image-capturing chip, and the right conductive chip pads are disposed on a right region of the image-capturing chip; wherein, except for the first left conductive pads and the first right conductive pads, no other conductive pad is disposed inside the concave space of the carrier substrate; wherein, except for the second left conductive pads and the second right conductive pads, no other conductive pad is disposed on the bottom side of the carrier body; wherein, except for the left conductive chip pads and the right conductive chip pads, no other conductive pad is disposed on the image-capturing chip.

3. The customized image-capturing module according to claim 1, wherein the lens holder is disposed on an upper surface of the carrier body, and the concave space is recessed from the upper surface of the carrier body, so that the concave space opens toward the lens structure; wherein the first conductive pads are disposed inside the concave space and face the lens assembly, the second conductive pads are disposed on a lower surface of the carrier body, and the second conductive pad has an area larger than that of the first conductive pad; wherein the conductive chip pads face the lens structure, and the conductive chip pads are electrically connected to the first conductive pads through a plurality of conductive wires, respectively; wherein a minimum distance between a side of the second conductive pad and a side of the carrier body is less than a length of the second conductive pad, and an unoccupied region is formed between the side of the second conductive pad and the side of the carrier body.

4. The customized image-capturing module according to claim 1, wherein the light filtering element is partially received inside the through opening; wherein the lens holder is disposed on an upper surface of the carrier body, and the concave space is recessed from a lower surface of the carrier body, so that the concave space is oppositely arranged to the lens structure; wherein the first conductive pads are disposed inside the concave space and are blocked by the carrier body to be unable to face the lens assembly, the second conductive pads are disposed on the lower surface of the carrier body, and the second conductive pad has an area larger than that of the first conductive pad; wherein the conductive chip pads face the concave space, and the conductive chip pads are electrically connected to the first conductive pads through a plurality of conductive wires, respectively; wherein a minimum distance between a side of the second conductive pad and a side of the carrier body is less than a length of the second conductive pad, and an unoccupied region is formed between the side of the second conductive pad and the side of the carrier body.

5. A customized image-capturing module, comprising:
a carrier substrate including a carrier body, a plurality of first conductive pads, and a plurality of second conductive pads, wherein the carrier body has a concave space;
an image-capturing chip disposed inside the concave space of the carrier body, wherein the image-capturing chip includes a plurality of conductive chip pads;
a lens assembly disposed on the carrier body; and
a light filtering element disposed above an image sensing region of the image-capturing chip by support of a plurality of supporters, wherein the light filtering element is disposed between the image-capturing chip and a lens structure of the lens assembly;
wherein the second conductive pads are exposed from a bottom side of the carrier body, and the conductive chip pads of the image-capturing chip are electrically connected to the second conductive pads through the first conductive pads, respectively.

6. A portable electronic device using an image-capturing assembly, the image-capturing assembly including a circuit substrate, a plurality of electronic elements disposed on the circuit substrate, and a customized image-capturing module disposed on the circuit substrate, wherein the customized image-capturing module includes:
a carrier substrate including a carrier body, a plurality of first conductive pads disposed on the carrier body, a plurality of second conductive pads disposed on the carrier body, and a plurality of conductive circuits disposed inside the carrier body, wherein the carrier body has a through opening and a concave space in communication with the through opening;
an image-capturing chip disposed inside the concave space of the carrier body, wherein the image-capturing chip includes an image sensing region and a plurality of conductive chip pads respectively and electrically connected to the first conductive pads;
a lens assembly including a lens holder disposed on the carrier body and a lens structure carried by the lens holder; and
a light filtering element disposed above the image sensing region of the image-capturing chip by support of a plurality of supporters, wherein the light filtering element is disposed between the image-capturing chip and the lens structure;
wherein the second conductive pads are exposed from a bottom side of the carrier body, and the conductive chip pads of the image-capturing chip are electrically connected to the second conductive pads through the first conductive pads, respectively.

7. The portable electronic device according to claim 6, wherein the image-capturing chip is completely received inside the concave space of the carrier body; wherein the circuit substrate includes a substrate body and a plurality of conductive substrate pads disposed on the substrate body, and the substrate body has a receiving space recessed from an upper surface of the substrate body; wherein the conductive substrate pads are disposed inside the receiving space of the substrate body, and the electronic elements are disposed on the upper surface of the substrate body; wherein, when the customized image-capturing module is partially disposed inside the receiving space of the circuit substrate and positioned between two of the electronic elements, the second conductive pads of the carrier substrate are respectively and electrically connected to the conductive substrate pads of the circuit substrate.

8. The portable electronic device according to claim 6, wherein the first conductive pads are divided into a plurality of first left conductive pads and a plurality of first right conductive pads, the first left conductive pads are disposed on a first left region inside the concave space, and the first right conductive pads are disposed on a first right region inside the concave space; wherein the second conductive pads are divided into a plurality of second left conductive pads and a plurality of second right conductive pads, the second left conductive pads are disposed on a second left region of the bottom side of the carrier body, and the second right conductive pads are disposed on a second right region of the bottom side of the carrier body; wherein the conductive chip pads are divided into a plurality of left conductive chip pads and a plurality of right conductive chip pads, the left conductive chip pads are disposed on a left region of the image-capturing chip, and the right conductive chip pads are disposed on a right region of the image-capturing chip; wherein, except for the first left conductive pads and the first right conductive pads, no other conductive pad is disposed inside the concave space of the carrier substrate; wherein, except for the second left conductive pads and the second right conductive pads, no other conductive pad is disposed on the bottom side of the carrier body; wherein, except for the left conductive chip pads and the right conductive chip pads, no other conductive pad is disposed on the image-capturing chip.

9. The portable electronic device according to claim 6, wherein the lens holder is disposed on an upper surface of the carrier body, and the concave space is concaved inward from the upper surface of the carrier body, so that the concave space opens toward the lens structure; wherein the first conductive pads are disposed inside the concave space and face the lens assembly, the second conductive pads are disposed on a lower surface of the carrier body, and the second conductive pad has an area larger than that of the first conductive pad; wherein the conductive chip pads face the lens structure, and the conductive chip pads are electrically connected to the first conductive pads through a plurality of conductive wires, respectively; wherein a minimum distance between a side of the second conductive pad and a side of the carrier body is less than a length of the second conductive pad, and an unoccupied region is formed between the side of the second conductive pad and the side of the carrier body.

10. The portable electronic device according to claim 6, wherein the light filtering element is partially received inside the through opening; wherein the lens holder is disposed on an upper surface of the carrier body, and the concave space is concaved inward from a lower surface of the carrier body, so that the concave space is oppositely arranged to the lens structure; wherein the first conductive pads are disposed inside the concave space and are blocked by the carrier body to be unable to face the lens assembly, the second conductive pads are disposed on the lower surface of the carrier body, and the second conductive pad has an area larger than that of the first conductive pad; wherein the conductive chip pads face the concave space, and the conductive chip pads are electrically connected to the first conductive pads through a plurality of conductive wires, respectively; wherein a minimum distance between a side of the second conductive pad and a side of the carrier body is less than a length of the second conductive pad, and an unoccupied region is formed between the side of the second conductive pad and the side of the carrier body.

* * * * *